T. C. PEARS.
MANUFACTURE OF GLASSWARE.

No. 179,951. Patented July 18, 1876.

Witnesses—
James D. Kay
Paul Bakewell

Inventor
Thomas C. Pears
by Bakewell & Kerr
Atty's

UNITED STATES PATENT OFFICE.

THOMAS C. PEARS, OF PITTSBURG, PENNSYLVANIA.

IMPROVEMENT IN THE MANUFACTURE OF GLASSWARE.

Specification forming part of Letters Patent No. 179,951, dated July 18, 1876; application filed June 27, 1876.

*To all whom it may concern:*

Be it known that I, THOMAS C. PEARS, of Pittsburg, in the county of Allegheny and State of Pennsylvania, have invented a new and useful Improvement in Manufacture of Glassware; and I do hereby declare the following to be a full, clear, and exact description thereof, reference being had to the accompanying drawing, forming a part of this specification, in which—

Figure 1:
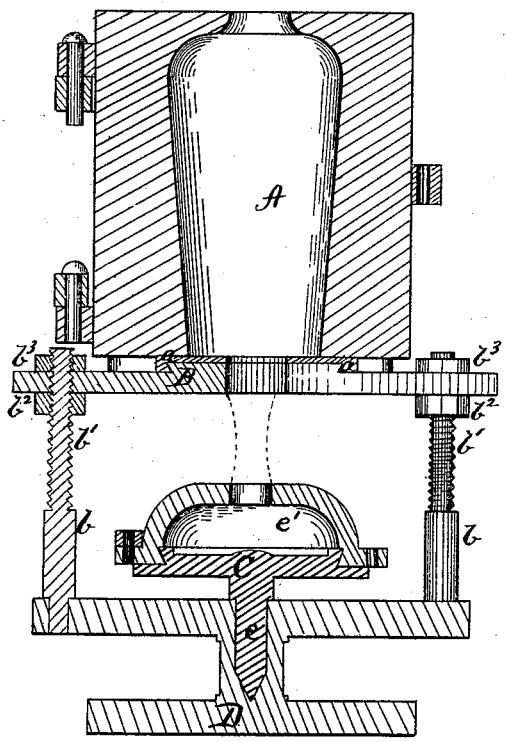
Figure 2:
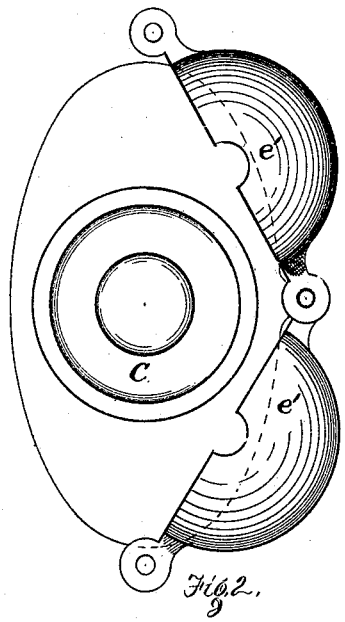
Figure 3:
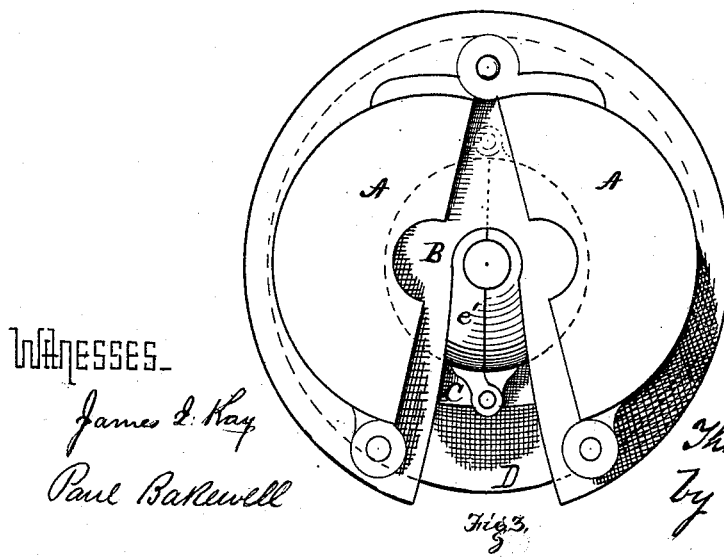

Figure 1 is a vertical section of devices which may be employed in carrying out my invention. Fig. 2 is a plan of the rotary platform and cup-clamp. Fig. 3 is a plan view of the devices, the mold partially open.

Like letters of reference indicate like parts in each.

My invention relates to process and apparatus for the manufacture of an article of glassware having a solid or pressed foot, or foot and stem, and a seamless blown bowl.

Before proceeding to describe my invention, I will briefly recite the present and well-known methods, so that the essential features of my invention may the more clearly appear in the subsequent description.

Heretofore a seamless glass article having a hollow blown foot, the cavity of the foot continuous with the bowl—as, for instance, vases and lamps—has been produced by rotating the mold or the article within the mold during the blowing of the article; secondly, a glass article, such as a goblet or lamp having a pressed foot, or foot and stem and blown bowl, has been produced by pressing up the foot and blowing the bowl thereon; but in such cases the foot and mold for the bowl being fixed, the bowl was always seamed or mold-marked; thirdly, a glass article, such as a goblet or wine-glass, has been formed by pressing the bowl and stem in one solid mold, and the foot-piece in a sectional mold, so as to avoid mold-marks on the bowl, and the parts united while sufficiently hot for that purpose; but this is a tedious operation, necessitating several handlings of the article, and greatly increasing the cost of manufacture, and not productive of the quality of a blown bowl; and, finally, stemmed and footed seamless glassware has been made by hand, such being the fine quality of blown ware requiring experienced and skilled labor, and produced at great expense. So far as I am aware, no article of glassware having a seamless blown bowl and a solid pressed-glass foot has heretofore been produced.

I will now proceed to describe my method of producing the same, and for that purpose will refer to the accompanying drawing.

A indicates a sectional blow-mold for forming the bowl of the article, said mold being of any suitable interior configuration, provided it is a shape which will not interfere with the rotation of the article to be formed. To the bottom of mold A is secured, by suitable screws, a plate, having a beveled recess, $a$, or suitable catches for securing the mold to, and centering it upon and with, a platform or bottom plate, B, supported by pillars $b\ b$ on a bed-plate, D. The top of the pillars may be threaded, as at $b^1$, and provided with nuts $b^2$ $b^3$, so that the height of the mold above the bed-plate can be varied. C is a loose platform or plate, supported by a spindle, $e$, stepped in the bed-plate D. This plate is capable of rotation, and is provided with the cup clamp or devices $e'$, for securing a pressed-glass foot, or foot and stem, and centering it with the mold.

The mold A should be made either of wood, graphite, of metal coated with plumbago, or coated with a compound of sawdust and linseed-oil, or of a material of the class specified, for reasons well known to the manufacturer of glass, and therefore not necessary to specify herein.

In carrying out my process I proceed as follows: The several parts of the devices illustrated, or equivalent devices, being in the position shown, a pressed-glass foot or foot and stem of any desired shape, is placed upon platform or rotary table C, and secured by cup-clamps $c$, so as to center with mold A. The blower then inserts the punty with a "gathering" thereon, within the mold, and proceeds to blow the bowl, rotating the glass back and forth within the mold, thus preventing the formation of mold marks or seams. As soon as the glass on the punty comes in contact with the pressed foot, previously set in the mold, as before specified, union of the two will take place, and the foot being centered with the mold and free to rotate, the bowl may be finished without mold-marks or seams, or distortion in any manner.

The foot being pressed before it is secured in, or in connection with the mold, any desired shape can be given to the same, and, if the desired shape is consistent therewith, it may be formed in a single mold, thus avoiding mold-marks on both foot and bowl.

The devices above specified seem to me the most desirable, because the most simple, for carrying out my invention; but it must be borne in mind that the object to be attained is the production of an article of glassware having a seamless blown bowl in connection with a pressed-glass foot, or foot and stem, the latter being either seamless or mold-marked, and that the essentials necessary in obtaining the result are, that the pressed-glass foot, if moved, must take its motion from, and move in unison with, the bowl being formed; or, if the mold is rotated during the operation, then the pressed-glass foot must be fixed and immovable in relation to the bowl being blown, and that it is essential that either the mold rotate or the parts specified be rotated.

Having thus described my invention, what I claim, and desire to secure by Letters Patent, is—

1. An article of glassware having a pressed-glass foot, or foot and stem, and a seamless blown bowl, substantially as herein described.

2. As an improvement in the manufacture of footed or footed and stemmed glassware, wherein a pressed foot is united to a blown bowl, causing the rotation of the foot and bowl relatively to the mold, or the rotation of the mold relatively to the foot and bowl during the time the bowl is being blown, substantially as and for the purpose specified.

In testimony whereof I, the said THOMAS C. PEARS, have hereunto set my hand.

THOMAS C. PEARS.

Witnesses:
F. W. RITTER, Jr.,
JAMES I. KAY.